United States Patent [19]

Takeuchi

[11] Patent Number: 4,528,563
[45] Date of Patent: Jul. 9, 1985

[54] REARWARD OBSTRUCTION SENSING SYSTEM FOR AUTOMOTIVE VEHICLE

[75] Inventor: Mikio Takeuchi, Zama, Japan

[73] Assignee: Nissan Motor Company, Limited, Yokohama, Japan

[21] Appl. No.: 544,775

[22] Filed: Oct. 24, 1983

[30] Foreign Application Priority Data

Nov. 11, 1982 [JP] Japan .................. 57-196707

[51] Int. Cl.³ .................................. G08G 1/00
[52] U.S. Cl. ............................ 340/903; 180/169; 340/70; 340/904; 340/943; 367/909
[58] Field of Search ............... 116/28 R, 28 A, 62.3; 180/169; 307/9; 340/901, 902, 903, 904, 943, 61, 70, 88, 961; 367/107, 112, 102, 116, 909; 455/99; 343/7 VM, 9, 10, 16 R, 386

[56] References Cited

U.S. PATENT DOCUMENTS

| | | | |
|---|---|---|---|
| 2,571,368 | 10/1951 | Kahn | 367/107 |
| 2,940,064 | 6/1960 | Wilfert | 340/88 |
| 3,172,075 | 3/1965 | Kay | 343/10 |
| 3,360,775 | 12/1967 | Schroeder . | |
| 3,842,397 | 10/1974 | Sindle . | |
| 3,921,004 | 11/1975 | Stark | 340/70 |
| 3,997,868 | 12/1976 | Ribnick | 340/903 |
| 4,015,232 | 3/1977 | Sindle . | |
| 4,103,278 | 7/1978 | Satake | 367/107 |
| 4,240,152 | 12/1980 | Duncan et al. . | |
| 4,278,962 | 7/1981 | Lin | 367/112 |
| 4,349,823 | 9/1982 | Tagami | 340/904 |
| 4,467,313 | 8/1984 | Yoshino | 367/909 |
| 4,490,716 | 12/1984 | Tsuda | 367/909 |

FOREIGN PATENT DOCUMENTS 48958 9/1981 European Pat. Off. .

Primary Examiner—John W. Caldwell, Sr.
Assistant Examiner—Michael F. Heim
Attorney, Agent, or Firm—Lowe, King, Price & Becker

[57] ABSTRACT

A rearward obstruction sensing system for an automotive vehicle detects obstructions within plural warning areas defined near the vehicle body. Four speakers near the four corners of the passenger compartment face toward the allocated warning areas when seen from the driver. When an obstruction is detected within a warning area, the speaker disposed on the side of the warning area within which the detected obstruction exists produces an intermittent alarm sound. Therefore, the driver can intuitively or sensorially recognize the direction of an obstruction existing within dead angles from the driver without watching a zone display device while backing up his vehicle. Further, the driver can determine the obstruction distance by distinguishing the period of the intermittent alarm sound, because the period thereof is proportional to the obstruction distance.

11 Claims, 7 Drawing Figures

REARWARD OBSTRUCTION SENSING SYSTEM FOR AUTOMOTIVE VEHICLE

BACKGROUND OF THE INVENTION

1. Field of the Invention

The present invention relates generally to an obstruction sensing system for an automotive vehicle and more particularly to a rearward obstruction sensing system which can detect any obstructions existing within dead angles from the driver in order that the driver can safely back-up his vehicle into a garage, for instance.

2. Description of the Prior Art

Various obstruction sensing systems for automotive vehicles are well know. In these systems, a plurality of pairs of transmitter and receiver are arranged at the corners of the vehicle body in order to define each warning area near the vehicle. In the case of a rearward obstruction sensing system, usually one transmitter and receiver pair is arranged at each of the four corners, i.e., at the front left and right as well as the rear left and right portions of the body. When the system detects the presence of any obstructions within the predetermined warning areas, the alarm sound is produced and the warning area and the obstruction distance are both indicated on a zone display device pictorially.

When backing up a vehicle, the driver usually turns his face to the rear side of the vehicle, whereby this zone display device is usually disposed on the rear parcel rack. Therefore, when the driver hears the alarm sound, he must watch the zone display device in order to determine the direction of the obstructions and the distance from the vehicle to the detected obstruction. This causes a problem in that the driver cannot concentrate his attention to the backward side of the vehicle; in other words, the driver cannot intuitively or sensorially recognize the direction and distance of obstructions.

A more detailed description of the prior-art rearward obstruction sensing system for an automotive vehicle is made with reference to the attached drawings under DETAILED DESCRIPTION OF THE PREFERRED EMBODIMENTS.

SUMMARY OF THE INVENTION

With these problems in mind, therefore, it is the primary object of the present invention to provide a rearward obstruction sensing system for an automotive vehicle for enabling the driver to recognize intuitively or sensorially the direction and distance of obstructions, without watching a warning zone display device; that is, the driver can concentrate his attention to the rear side of the vehicle at all times while backing up his vehicle into a garage, for instance.

To achieve the above-mentioned object, the rearward obstruction sensing system for an automotive vehicle according to the present invention comprises: four transmitters for transmitting an obstruction sensing signal intermittently and sequentially; four receivers for receiving the obstruction sensing signal reflected from obstructions existing within the warning areas; a separate transmitter and receiver pair being arranged near each of four corners of the vehicle body; control means, such as a microcomputer, for: (a) controlling the transmitters and receivers intermittently and sequentially, (b) calculating obstruction distance, and (c) deriving intermittent obstruction distance signals having a period which is varied in proportion to the detected obstruction distance; and four alarm generators including speakers for generating an intermittent alarm sound when an obstruction is detected, one of the four alarm generators being allocated to each of four warning areas and arranged near each of four corners of the passenger compartment so as to face toward the allocated warning area respectively when seen from driver's position. Therefore, when an obstruction is detected, the speaker disposed on the side of the warning area within which the obstruction exists beings to produce an intermittent alarm sound, with the result that the driver can intuitively or sensorially recognize the direction of an obstruction existing within dead angles from the driver. Simultaneously, the driver can recognize the obstruction distance by determining the period of the intermittent alarm sound.

Further, in the case where a car audio set including four speakers is equipped within the passenger compartment, it is possible to use these speakers in common with the system of the invention, by providing simple switches, without equipping any additional speakers for the sensing system.

BRIEF DESCRIPTION OF THE DRAWINGS

The features and advantages of the rearward obstruction sensing system for an automotive vehicle according to the present invention over the prior-art system will be more clearly appreciated from the following description taken in conjunction with the accompanying drawings in which like reference numberals designate corresponding elements or sections throughout the drawings thereof and in which.

DETAILED DESCRIPTION OF THE PREFERRED EMBODIMENTS

To facilitate understanding of the present invention, reference is made to a prior-art ultrasonic rearward obstruction sensing system for an automotive vehicle, by way of example, with reference to the attached drawings.

Figure 1:
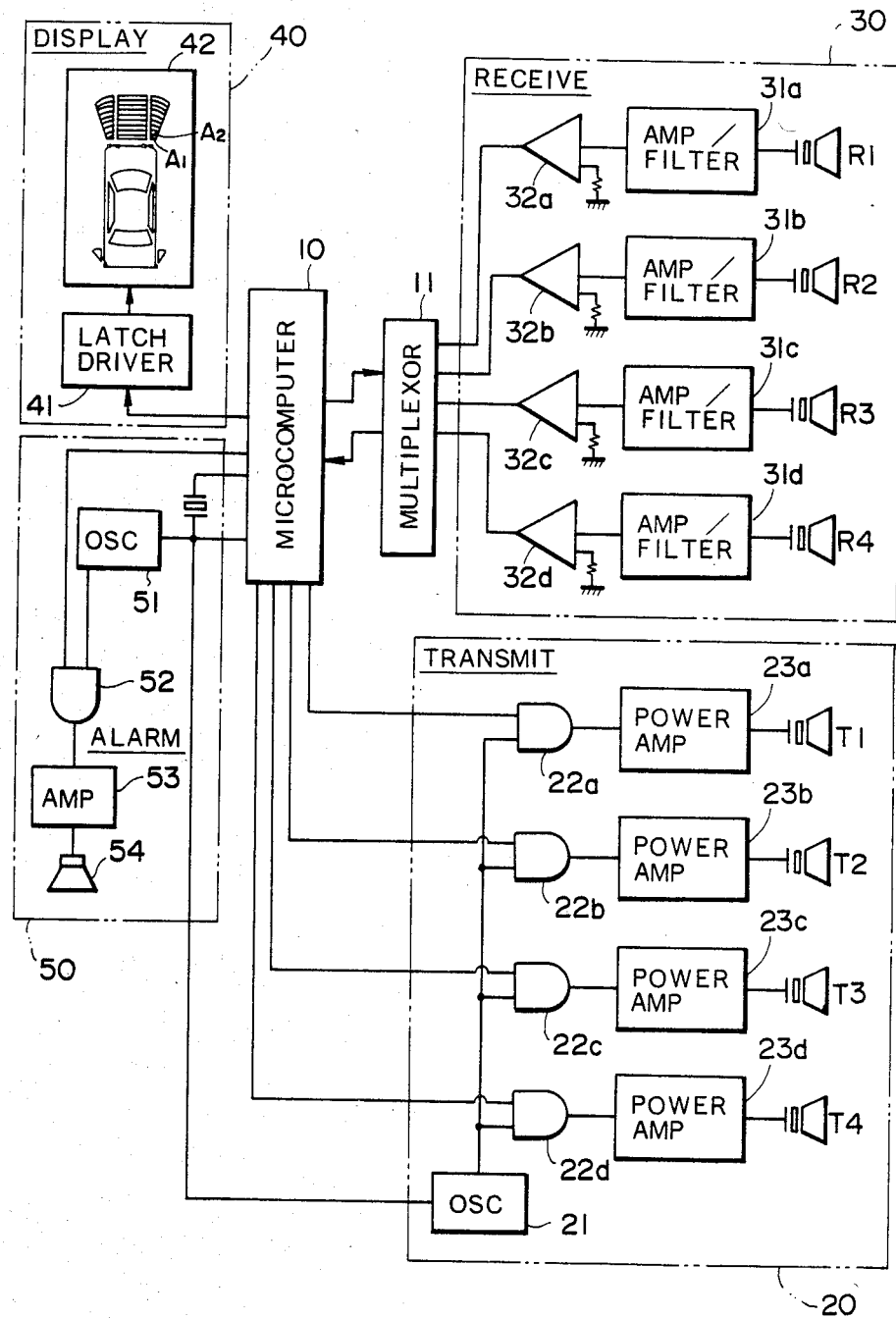
FIG. 1 is a schematic block diagram of an example of prior-art rearward obstruction sensing systems for an automotive vehicle.

In FIG. 1, the system is roughly made up of a microcomputer 10, a multiplexor 11, an ultrasonic wave signal transmitting section 20 including four ultrasonic transmitters or transducers $T_1$, $T_2$, $T_3$ and $T_4$, an ultrasonic wave signal receiving section 30 including four ultrasonic receivers or transducers $R_1$, $R_2$, $R_3$ and $R_4$, a zone display device 40 including a latch driver 41, and an alarm generating section 50 including a speaker.

Figure 2:
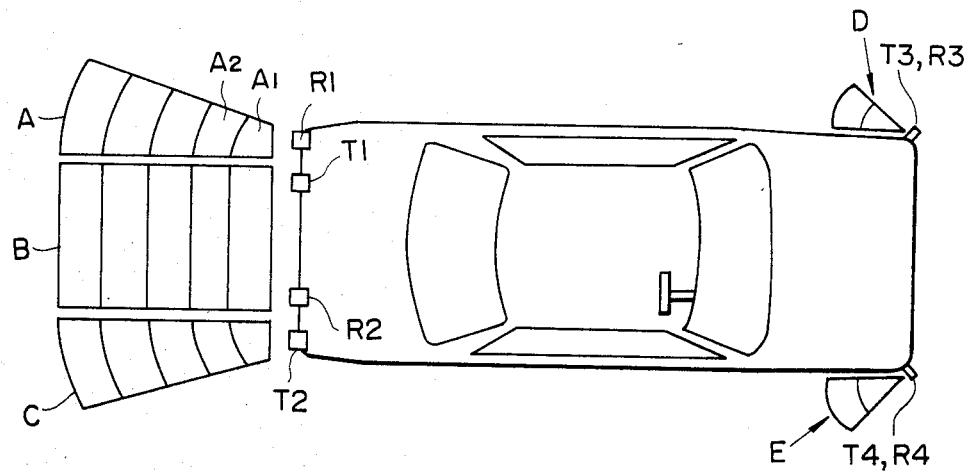
FIG. 2 is an illustration of an automotive vehicle equipped with the rearward obstruction sensing system shown in FIG. 1, which depicts the positions where four pairs of ultrasonic signal transmitter and receiver are arranged, and the rearward warning areas.

As shown in FIG. 2, a first transmitter-receiver pair including transmitter $T_1$ and receiver $R_1$ is arranged at or near the rear, left side corner of the vehicle; a second transmitter-receiver pair including transmitter $T_2$ and receiver $R_2$ is arranged at or near the rear, right side corner; a third transmitter-receiver pair including transmitter $T_3$ and receiver $R_3$ is arranged at the front, left side corner of the vehicle; and a fourth transmitter-receiver pair including transmitter $T_4$ and receiver $R_4$ is arranged at the front, right side corner of the vehicle. The first, second, third and fourth pairs respectively detect obstructions existing within third, fourth and fifth warning areas A, C, D and E. The first and second receiver pairs including transmitters $T_1$ and $T_2$ and receivers $R_1$ and $R_2$ together detect obstructions existing within a second warning area B.

The ultrasonic wave signal transmitting section 20 includes an oscillator 21 for deriving an oscillating wave in cooperation with a quartz vibrator X, four AND gates 22a, 22b, 22c and 22d, four power amplifiers 23a, 23b 23c and 23d, and four ultrasonic wave signal transmitters (transducers) $T_1$, $T_2$, $T_3$ and $T_4$.

The microcomputer 10 supplies four intermittent output command signals separately and sequentially to one of two input terminals of four AND gates 22a to 22d in such a way that the four signals do not overlap with each other. On the other hand, the oscillator 21 continuously supplies an oscillating signal to two other input terminals of four AND gates 22a 22d simultaneously and continuously. When the command signal from the microcomputer 10 and the oscillation signal overlap with each other, the AND gates 22a to 22d derive a transmission signal for a fixed time period respectively. The transmission signal coupled through each of four AND gates 22a to 22d is respectively amplified by power amplifiers 23a, 23b, 23c and 23d to energize each of four ultrasonic transmitters (transducers) $T_1$ to $T_4$. Therefore, four transmitters $T_1$ to $T_4$ transmit an ultrasonic wave signal separately and sequentially to each of warning areas A to E.

The ultrasonic wave signal receiving section 30 includes four ultrasonic wave signal receivers (transducers) $R_1$, $R_2$, $R_3$ and $R_4$, four amplifiers/filters 31a, 32b, 32c and 32d and four voltage level comparators 32a, 32b, 32c and 32d.

In case obstructions exist within the warning areas A to E, the receivers $R_1$ to $R_4$ sequentially receive an ultrasonic wave signal transmitted from the transmitters $T_1$ to $T_4$ and reflected by obstructions. The received ultrasonic wave signals are amplified and filtered by the four amplifiers/filters 31a to 31d respectively. The filters serve to eliminate electrical noise superimposed on the detected ultrasonic wave signal. The amplified and filtered signal levels are then separately and sequentially compared with a predetermined level by four comparators 32a to 32d. When the amplified and filtered signal levels exceed the predetermined value, each of the comparators 32a to 32d derives an obstruction detection signal.

The microcomputer 10 separately and sequentially supplies four intermittent input command signals to the multiplexor 11 in synchronization with the four intermittent output command signals respectively. In response to these four input command signals, the multiplexor 11 sequentially supplies the obstruction detection signals to the microcomputer 10. On the basis of these obstruction detection signals, the microcomputer 10 calculates, for each of warning areas A to E, the difference between the time when the transmitter transmits an ultrasonic signal and the time when the receiver receives the ultrasonic signal reflected from obstructions. That is, the microcomputer 10 separately calculates the distances to detected obstructions on the basis of these time differences and the ultrasonic wave signal propagation speed for each warning area. The calculated distance signal is supplied to the zone display device 40 by the microcomputer 10.

Figure 3:
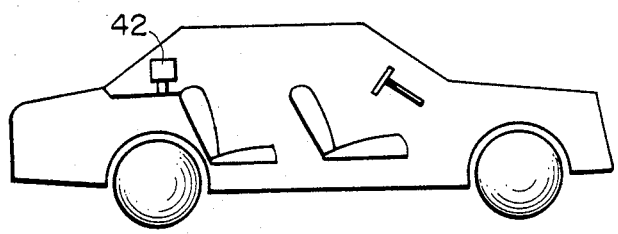
FIG. 3 is an illustration of an automotive vehicle equipped with the rearward obstruction sensing system shown in FIG. 1, with a specific showing of the mounting position for a zone display device.

The zone display device 40 displays the detected warning area and calculated obstruction distance pictorially. Here, the term "zone" means a plurality of partitioned sector portions within each warning area on the display 42. In more detail, the case of an obstruciton being in the first warning area A within 0.3m from the rear, left corner of the vehicle, the zone $A_1$ on the display 42 is illuminated; in the case of an obstruction being in the same warning area A between 0.3m and 0.5m from the vehicle, the zone $A_2$ is illuminated, as depicted in the zone display device 42 of FIG. 1. Further, the latch driver 41 keeps the display zone corresponding to the detected area and calculated distance illuminated until the detected obstruction is outside the region corresponding to the illuminated zone. The zone display device 42 is usually disposed on the rear parcel rack within the passenger compartment as depicted in FIG. 3. This is because the driver, while backing up the vehicle, must turn his face to look to the rearward side of the vehicle for safety.

The alarm generation section 50 includes a quartz vibrator X, an oscillator 51, an AND gate 52, an amplifier 53 and a speaker 54. The output of the oscillator 51 is connected to one input terminal of the AND gate 52 to generate an alarm sound with an appropriate frequency. The microcomputer supplies the other input terminal of the AND gate 52 with an intermittent pulse signal, having a period which is proportional to the calculated obstruction distance. That is to say, the shorter the obstruction distance, the smaller the period of the intermittent alarm sound signal. Further, in the case of plural obstructions being detected simultaneously, the activated sound signal corresponds to the distance to the nearest obstruction. When the intermittent pulse signal from the microcomputer 10 and the oscillation signal overlap with each other, the AND gate 52 derives an intermittent alarm signal that is amplified by the amplifier, causing speaker 54 to produce an alarm sound.

In the prior-art rearward obstruction sensing system for an automotive vehicle, when the driver hears the alarm sound, he must watch the zone display device disposed within the passenger compartment in order to know the direction of and the distance to the obstruction; simultaneously the driver must pay attention to the rear outside of the vehicle. That is, the driver cannot intuitively or sensorially recognize the direction of and distance to the obstruction and therefore he cannot concentrate his attention to the backward side of the vehicle.

In view of the above description, reference is now made to a first embodiment of the rearward obstruction sensing system for an automotive vehicle according to the present invention with reference to the attached drawings.

Figure 4:
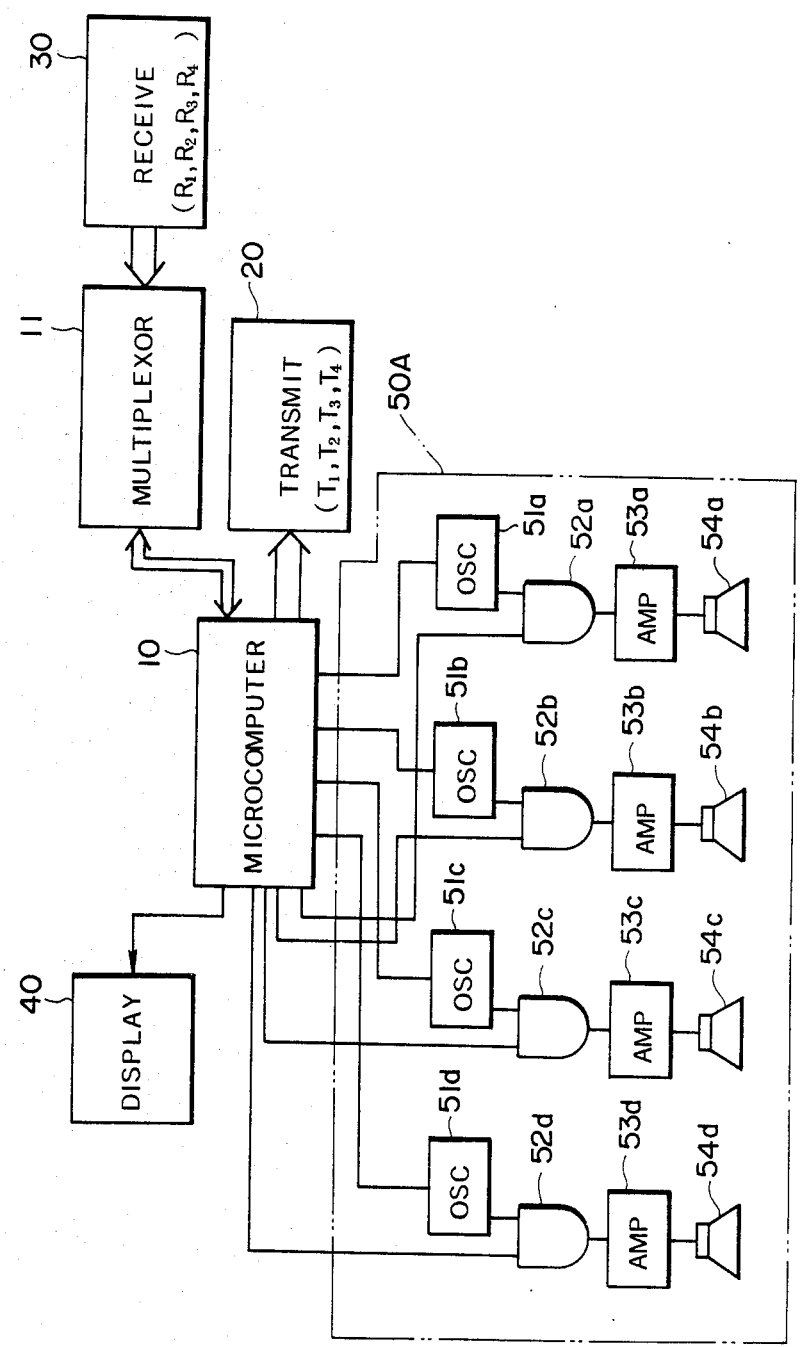
FIG. 4 is a schematic block diagram of a first embodiment of the rearward obstruction sensing system for an automotive vehicle according to the present invention.
Figure 5:
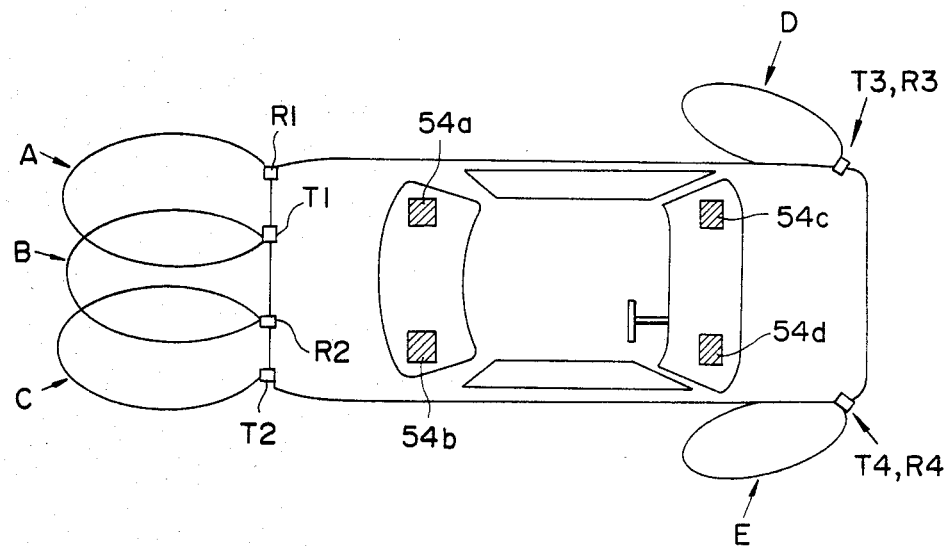
FIG. 5 is an illustration of an automotive vehicle equipped with the rearward obstruction sensing system shown in FIG. 4, wherein there are illustrated the positions of four pairs of ultrasonic signal transmitters and receivers, five rearward warning areas, and four alarm generators.

FIG. 4 is a schematic block diagram of the first embodiment of the rearward obstruction sensing system of the invention. The system is roughly made up of a microcomputer 10, a multiplexor 11, an ultrasonic wave signal transmitting section 20 including four ultrasonic transmitters $T_1$, $T_2$, $T_3$ and $T_4$, an ultrasonic wave signal receiving section 30 including four ultrasonic receivers $R_1$, $R_2$, $R_3$, $R_4$, a zone display device 40 and an alarm generating section 50A, similarly to the prior-art system already described with reference to FIG. 1. As illustrated in FIG. 5, the system includes first, second, third and fourth transmitter-receiver pairs respectively including transmitter $T_1$ and receiver $R_1$ (arranged at or near the rear, left side corner of a vehicle), a transmitter $T_2$ and receiver $R_2$ (arranged at or near the rear, right side corner of the vehicle), transmitter $T_3$ and receiver $R_3$ (arranged at the front, left side corner of the vehicle), and transmitter $T_4$ and receiver $R_4$ (arranged at the front, right side corner of the vehicle). The first, second, third and fourth transmitter-receiver pairs respectively detect obstructions within a first warning area A; a third warning area C; a fourth warning area D and a fifth warning area E. The first and second transmitter-receiver pairs together detect obstructions existing within a second warning area B, also in the same manner as the prior-art system shown in FIG. 2.

An ultrasonic wave signal sequentially transmitted from each of four transmitters $T_1$ to $T_4$ independently and separately is reflected from obstructions existing within each of the warning areas A to E and sequentially received by each of corresponding receivers $R_1$ to $R_4$. The microcomputer 10 calculates the difference between the time when an ultrasonic signal is transmitted from the transmitter and the time when the ultrasonic signal reflected from an obstruction is received by the receiver for each of warning areas A to E. The microcomputer 10 further calculates distances to obstructions on the basis of the calculated time differences and ultrasonic wave signal propagation speed independently for each warning area. The detected obstruction areas and the obstruction distances are indicated on the zone display device 40 in the same manner as in the prior-art sensing system.

However, the alarm generating section 50A according to the present invention is made up of four generating subsections, different from the alarm generating section 50 of the prior-art sensing system shown in FIG. 1. A first alarm generating subsection includes a first oscillator 51a, a first AND gate 52b, a first amplifier 53a and a first speaker 54a. Similarly, second, third and fourth alarm generating subsections each include second, third and fourth oscillators 51b, 51c and 51d; second, third and fourth AND gates 52b, 52c and 52d; second, third and fourth amplifiers 53b, 53c and 53d; and second, third and fourth speakers 54b, 54c and 54d, respectively.

The first speaker 54a is disposed at or near the rear, left side corner of the passenger compartment so as to face toward the first warning area A; the second speaker 54b is disposed at or near the rear, right side corner of the passenger compartment so as to face toward the third warning area C; the third speaker 54c is disposed at or near the front, left side corner of the passenger compartment so as to face toward the fourth warning area D; and the fourth speaker 54d is disposed at or near the front, right side corner of the passenger compartment so as to face toward the fifth warning area E when seen from the driver position. Further, it is also possible to dispose an additional speaker at the rear, middle portion of the passenger compartment so as to face toward the second warning area B. However, in the embodiment shown in FIG. 4, the microcomputer is so implemented that when obstructions exist within the second warning area B, an alarm sound is produced from the first and second speakers 54a and 54b at the same time.

The operation of the alarm generating section 50A of the rearward obstruction sensing system according to the present invention is described hereinbelow in more detail on the basis of practical numerical values.

When any obstruction exists within the warning area A, the ultrasonic wave signal transmitted from the first transmitter $T_1$ is reflected from the obstruction and then received by the first receiver $R_1$. The received ultrasonic wave signal is amplified and filtered to eliminate the noise superimposed upon the received signal. The voltage level of the amplified and filtered signal is compared with a predetermined value. If the level exceeds the predetermined value, an obstruction detection signal is detected and applied to the microcomputer 10 from the comparator. The microcomputer 10 calculates the difference between the time when the transmitter $T_1$ transmits the ultrasonic signal and the time when the receiver $R_1$ receives the reflected ultrasonic signal. Thereafter, the microcomputer 10 calculates the obstruction distance on the basis of the calculated time difference and the ultrasonic wave propagation speed. According to the magnitude of the calculated obstruction distance, the microcomputer 10 supplies an intermittent pulse signal to the first AND gate 52a. The relationship between the obstruction distance and the period of the intermittent pulse signal is, for instance, as follows:

| Obstruction Distance (m) | Period (ms) (H: high voltage level) (L: low voltage level) |
| --- | --- |
| 0.3 or less | Continuous |
| 0.3 to 0.5 | 100 (H: 50 ms, L: 50 ms) |
| 0.5 to 1.0 | 200 (H: 50 ms, L: 150 ms) |
| 1.0 to 1.5 | 400 (H: 50 ms, L: 350 ms) |
| 1.0 to 2.0 | 800 (H: 50 ms, L: 750 ms) |

As understood by the table above, the smaller the obstruction distance, the shorter the period of the intermittent sound signal in order to call the driver's attention to danger.

The above-mentioned intermittent pulse signal is applied to the first AND gate 52a. Since an oscillation signal is always applied to the first AND gate 52a from the first oscillator 51a, the first AND gate 52a derives an intermittent oscillation signal only when the intermittent pulse signal indicative of obstruction distance overlaps with the continuous oscillation signal. This signal is amplified through the first amplifier 53a and applied to the first speaker 54a to produce an intermittent alarm sound. Since the first speaker 54a is disposed at the rear, left corner of the passenger compartment, the driver upon hearing the alarm sound can notice the direction of obstructions intuitively or sensorially without watching the zone display 42. The driver can of course determine the obstruction distance by correlating the period of the period of the intermittent alarm sound he hears with distance because the period of the heard sound is proportional to the obstruction distance.

When any obstruciton exists within the warning area B, the microcomputer 10 simultaneously supplies two intermittent pulse signals, the periods of which are proportional to the obstruction distance, to both the first and second AND gates 52a and 52b. Therefore, the first and second speakers 54a and 54b produce an intermittent alarm sound at the same time, so that the driver realizes the presence of an obstruction within the warning area B.

When any obstruction within the warnin areas A, B, C, respectively and the distance to the obstruction existing within the warning area B is the shortest, the first and second speakers 54a and 54b simultaneously produce an intermittent alarm sound, indicating that the nearest obstruction exists within the warning area B; under such circumstances no sounds are produced for the other obstructions existing within the warning areas A and C. This is because it may be noisy to the driver and the passengers to produce so many kinds of intermittent alarm sounds at the same time.

Figure 6:
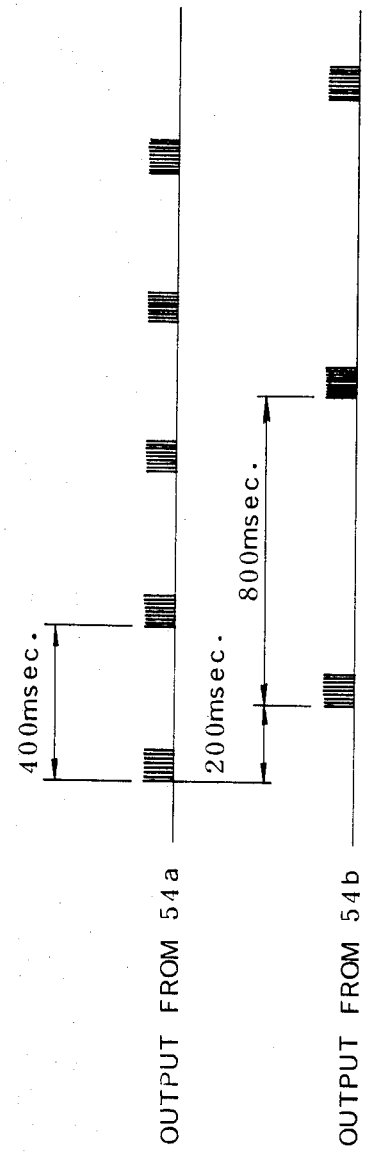
FIG. 6 is a timing chart of an exemplary intermittent alarm sound generation sequence from two alarm generators.

When the driver backs up his car into a garage obliquely against the wall, for instance, if the obstruction distances against the wall are 1.2m within the area A, 1.6m within the area B and 1.7m within the area C, respectively, that is, when either of obstruction distances within the areas A and C is shorter than that within the area B, the microcomputer 10 neglects the area B (1.6m) and supplies two intermittent pulse signals alternately to the first and third speakers 54a and 54c allocated to the warning areas A and C (1.2m and 1.7m). In more detail, the first speakers 54a and 54b alternately produce intermittent alarm sounds with periods of 400 and 800 msecs, respectively, as depicted in FIG. 6. Further, when any obstructions exist within the warning areas A and C at the same time, the first and second speakers 54a and 54b produce two kinds of intermittent alarm sounds with the periods corresponding to the two detected obstruction distances. Furthermore, with respect to the warning area A, B and C, it is also possible to produce an intermittent alarm sound from only a speaker allocated to the warning area within the nearest obstruction from the vehicle exists. In this case, however, if the nearest obstruction exists within the warning area B, two speakers 54a and 54b simultaneously produce the same alarm sound.

When any obstruction exists within the warning area D or E, the third or the fourth speaker 54c or 54d independently produces an intermittent alarm sound with the period corresponding to the detected obstruction distance in the same way as described above.

Automotive vehicles now frequently include audio sets, such as radios and/or cassette tape recorders, having four loud speakers within the passenger compartment. Usually, one speaker is arranged at each corner of the passenger compartment.

Figure 7:
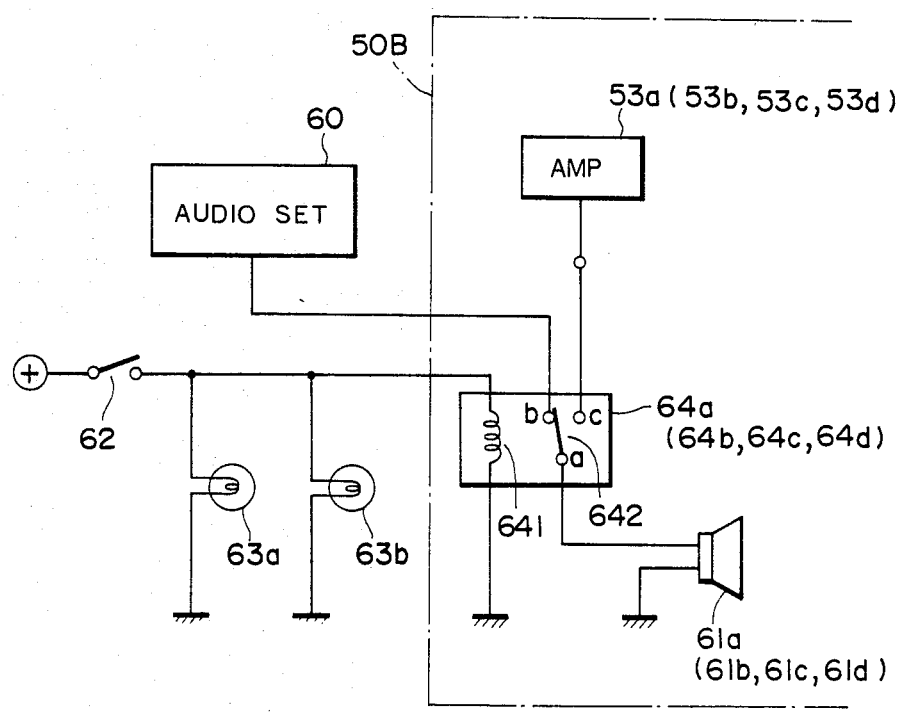
FIG. 7 is a fragmentary schematic block diagram of a second embodiment of the rearward obstruction sensing system according to the present invention, in which the speakers equipped for a car audio set are used in common with the speakers for the alarm generators of the sensing system according to the present invention.

In a second embodiment of the alarm generator section 50B of the rearward obstruction sensing system according to the present invention, as shown in FIG. 7 (in which only one speaker is shown), the four speakers 54a to 54d shown in FIG. 4 are used in common with the speakers 61a to 61d provided for the car audio set.

In FIG. 7 are illustrated conventional automotive components which function in cooperation with the present invention, viz: audio set 60, gear shift lever responsive switch 62 and back up lights 63a and 63b. Audio Set 60, which may be a radio and/or cassette tape recorder, includes four speakers 61a, 61b, 61c and 61d located in the four corners of the automobile interior. Gear shift lever switch 62 is closed when the driver sets the automobile gear shift lever to the rear position to energize back up lamps 63a and 63b.

In this second embodiment, four single-pole double-throw switches 64a to 64d are additionally provided in the alarm generating section 50B. The switch 64a includes a relay coil 641 energized when the gear shift lever is set to the rear position and a relay switch 642. The movable contact a of the relay switch 642 is connected to the first speaker 61a; the first fixed contact of switch 642 is connected to the audio set, and the second fixed contact c thereof is connected to the first amplifier 53a of the alarm generator section 50B according to the present invention.

When the gear shift lever is set to positions other than rear position, the gear shift lever switch 62 is open, causing relay coil 641 to be deenergized whereby the movable contact a is set to the first contact b and the first speaker 61a is connected to the audio set 60 to produce audio signals. On the other hand, when the gear shift lever is set to the rear position, the gear shift lever switch 62 is closed, causing the relay coil 641 to be energized to bring the movable contact a into contact with the second fixed contact c, so that the first speaker 61a is connected to the first amplifier 53a of the alarm generating section 50B to produce an intermittent alarm signal.

In this second embodiment, when the driver sets the gear shift lever to the rear position, since the audio set is automatically disabled, it is possible for the driver to direct his attention to the back side of the vehicle more carefully. While only the first speaker 61a and the first relay 64a are shown in FIG. 7, it is understood that four speakers (61a to 61d) and four switches (64a to 64d) are necessary.

The embodiments of the rearward obstruction sensing system for an automotive vehicle according to the present invention have been described of the case where ultrasonic wave signals are used for detecting obstructions, by way of example. However, it is possible to apply the present invention to any other sensing systems in which other signals such as electromagnetic wave signals, optical signals, magnetic signals or other signals are used for detecting obstructions.

Further, in the second embodiment shown in FIG. 7, four separate relays 64a to 64d are used. It is possible to use a ganged two-way switch in which four single-pole double-throw switches are actuated by a single coil.

As described above, in the rearward obstruction sensing system for an automotive vehicle according to the present invention which detects any obstructions existing within a plurality of warning areas defined near the vehicle for each warning area and derives an intermittent alarm signal having a period proportional to the obstruction distance, since a plurality of alarm generating means are arranged near the corners of the passenger compartment so as to face to the allocated warning areas, respectively, when seen from the driver, the driver can recognize the direction of obstructions existing within dead angles from the driver intuitively or sensorially, without looking at the zone display device while backing up his vehicle. Further, the driver can determine the obstruction distance by distinguishing the period of the intermittent alarm sound, because the period is proportional to the obstruction distance.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A rearward obstruction sensing system for an automotive vehicle including a vehicle body, a passenger compartment, a gear shift lever and a car audio set, which comprises:

(a) means for intermittently and sequentially transmitting plural obstruction sensing signals from near each corner of the vehicle body for enabling detection of obstructions existing within plural warning areas near the vehicle, each of said warning areas being defined by said transmitted signals;

(b) a plurality of means for receiving the obstruction sensing signal transmitted from said transmitting means and reflected from obstructions existing within the warning areas, each of said receiving means being arranged near the corners of the vehicle body being mated with each of said transmitting means;

(c) means for controlling said transmitting means and said receiving means, said controlling means intermittently and sequentially supplying an intermittent output command signal to said transmitting means to cause the intermittent obstruction sensing signal to be sequentially transmitted from said transmitting means so as to enable derivation of a reflected signal to be received by the receiving means, said controlling means calculating obstruction distances on the basis of the difference between the time when the sensing signal is transmitted and the time when the sensing signal is received and the sensing signal propagation speed, and said controlling means further deriving intermittent obstruction distance signals having a period which varies as a monotonic function of the detected obstruction distance; and (d) means for generating plural intermittent aural alarm signals, one of said aural alarm signals being generated in response to said controlling mens detecting the presence of any obstructions within any of the warning areas, each of said aural alarm signals being allocated to each of the warning areas respectively and originating near each corner of the passenger compartment so as to be propagated from the direction of the allocated warning areas respectively toward the driver's position;

said transmitting means including four separate transmitting transducers, said receiving means including four separate receiving transducers and said alarm generating means including four separate aural transducers, a first pair of the transmitting and receiving transducers being disposed near the rear, left side corner of the vehicle body, a second pair of the transmitting and receiving transducers being disposed near the rear, right side corner of the vehicle body, a third pair of the transmitting and receiving transducers being disposed near the front, left side corner of the vehicle body, a fourth pair of the transmitting and receiving transducers being disposed near the front, right side corner of the vehicle body, and a first of the aural transducers being disposed near the rear, left side corner of the passenger compartment, a second of the aural transducers being disposed near the rear, right side corner of the passenger compartment, a third of the aural transducers being disposed near the front, left side corner of the passenger compartment, and a fourth of the aural transducers being disposed near the front, right side corner of the passenger compartment;

said first transmitting, receiving and aural transducers being alocated to a first warning area A defined near the rear, left side of the vehicle body, said first and second transmitting, receiving and aural transducers being allocated to a second warning area B defined near the rear, middle portion of the vehicle body, said second transmitting, receiving and aural transducers being allocated to a third warning area C defined near the rear, right side of the vehicle body, said third transmitting, receiving and aural transducers being allocated to a fourth warning area D defined near the front, left side of the vehicle body, and said fourth transmitting, receiving means and aural transducers being allocated to a fifth warning area E defined near the front, right side of the vehicle body;

whereby the driver can recognize the direction and the distance of an obstruction existing within dead angles from the driver sensorially, without watching a display device.

2. A rearward obstruction sensing system as set forth in claim 1, wherein said aural alarm generating means comprises:

(a) an oscillator for continuously deriving an audio frequency oscillation alarm signal;

(b) gate means responsive to said controlling means and said oscillator for deriving a separate aural alarm signal at the audio frequency for each aural transducer in response to the oscillation alarm signal and the intermittent obstruction distance signal so that an intermittent audio alarm is derived by each aural transducer in response to derivation of the intermittent obstruction distance signal associated with the aural transducer;

(c) each aural transducer being responsive to said gate means for producing an intermittently oscillating audio frequency aural alarm signal having a period which is a monotonic function of the detected obstruction distance.

3. A rearward obstruction sensing system as set forth in claim 1, wherein said aural alarm generating means comprises:

(a) an oscillator for continuously deriving an audio frequency oscillation alarm signal;

(b) gate means responsive to said controlling means and said oscillator for deriving a separate aural alarm signal at the audio frequency for each aural transducer in response to the oscillation alarm signal and the intermittent obstruction distance signal so that an intermittent audio alarm is derived by each aural transducer in response to derivation of the intermittent obstruction distance signal asociated with the aural transducer;

(c) each aural transducer being a speaker of a car radio set equipped within the passenger compartment; and (d) a switch for connecting said gate means to said speakers so said speakers produce an intermittently oscillating alarm signal having a period which is a monotonic function of detected obstruction distance when the gear shift lever is set to the rear position and for connecting the car audio set to said speakers so said speakers produce audio signals of the car audio set when the gear shift lever is set to the positions other than the rear position, whereby the same speaker is used for the car audio set and as the aural alarm transducer.

4. An apparatus for aurally indicating to a driver in a vehicle passenger compartment of an automotive vehicle the bearing and range of obstacles in regions at different bearings in proximity to a vehicle and outside of the driver field of view, comprising transducer means for transmitting energy to and receiving energy from the regions, the received energy being reflected by an obstacle in the regions, an array of aural transducers in the compartment arranged to supply aural signals to the driver from points in the compartment angularly related to the bearings of the regions, means responsive to the received reflected energy for activating the aural transducers to produce an aural warning signal having a detectable directional component to the driver location commensurate with the bearing of the region where the obstacle is located relative to the vehicle and a duration that is a monotonic function of the distance between the vehicle and the obstacle so that the driver is able to discern from the directional component and the duration of the aural signal the bearing and range of the obstacles, different obstacles being susceptible to being simultaneously in regions at different bearings, said activating means including means responsive to the reflected energy for enabling the array to produce an aural warning signal only for the obstacle at the closest range.

5. An apparatus as set forth in claim 4 wherein the regions are to the rear of the vehicle, the array including first and second aural transducers respectively located in the rear left and rear right corners of the compartment, the means for respectively activating the first and second transducers in response to the obstacle being in regions behind left and right rear corners of the vehicle.

6. An apparatus as set forth in claim 4 wherein the regions are to the rear of the vehicle, the array including first and second aural transducers respectively located in the rear left and rear right corners of the compartment, the means for respectively activating the first and second transducers in response to the obstacle being in regions behind left and right rear corners of the vehicle and simultaneously activating both of the first and second transducers in response to the obstacle being in a region between the left and right rear corners of the vehicle.

7. An apparatus as set forth in claim 4 wherein the vehicle includes an audio set having an array of plural speakers with individual speakers at positions corresponding with the position of the aural transducers, a gear shift responsive switch means for: (a) normally coupling the speakers to audio frequency output signals of the audio set and (b) for decoupling the audio set output signals from the speakers and for coupling the aural warning signal to the individual speakers corresponding with the aural transducers in response to the gear switch lever being in the reverse position, whereby the individual speakers are the aural transducers.

8. An apparatus for aurally indicating to a driver in a vehicle passenger compartment of an automotive vehicle the bearing and range of obstacles in regions at different bearings in proximity to a vehicle and outside of the driver field of view, comprising transducer means for transmitting energy to and receiving energy from the regions, the received energy being reflected by an obstacle in the regions, an array of aural transducers in the compartment arranged to supply aural signals to the driver from points in the compartment angularly related to the bearings of the regions, means responsive to the received reflected energy for activating the aural transducers to produce an aural warning signal having a detectable directional component to the driver location commensurate with the bearing of the regions wherein the obstacle is located relative to the vehicle, different obstacles being susceptible to being simultaneously in regions at different bearings, said activating means including means responsive to the reflected energy for enabling the array to produce an aural warning signal only for the obstacle at the closest range.

9. An apparatus as set forth in claim 8 wherein the regions are to the rear of the vehicle, the array including first and second aural transducers respectively located in the rear left and rear right corners of the compartment, the means for respectively activating the first and second transducers in response to the obstacle being in regions behind left and right rear corners of the vehicle.

10. An apparatus as set forth in claim 8 wherein the regions are to the rear of the vehicle, the array including first and second aural transducers respectively located in the rear left and rear right corners of the compartment, the means for respectively activating the first and second transducers in response to the obstacle being in regions behind left and right rear corners of the vehicle and simultaneously activating both of the first and second transducers in response to the obstacle being in a region between the left and right rear corners of the vehicle.

11. An apparatus as set forth in claim 8 wherein the vehicle includes an audio set having an array of plural speakers with individual speakers at positions corresponding with the position of the aural transducers, a gear shift responsive switch means for: (a) normally coupling the speakers to audio frequency output signals of the audio set and (b) for decoupling the audio set output signals from the speakers and for coupling the aural warning signal to the individual speakers corresponding with the aural transducers in response to the gear switch lever being in the reverse position, whereby the individual speakers are the aural transducers.

* * * * *